Aug. 4, 1936.    H. J. NICHOLS    2,049,468

SHIFT MECHANISM

Filed Dec. 9, 1933    2 Sheets-Sheet 1

INVENTOR
Harry J. Nichols

Aug. 4, 1936.   H. J. NICHOLS   2,049,468
SHIFT MECHANISM
Filed Dec. 9, 1933   2 Sheets-Sheet 2

INVENTOR
Harry J. Nichols
Maréchal & Noe
attorneys

Patented Aug. 4, 1936

2,049,468

UNITED STATES PATENT OFFICE 2,049,468

SHIFT MECHANISM

Harry J. Nichols, Dayton, Ohio

Application December 9, 1933, Serial No. 701,644

11 Claims. (Cl. 197—71)

This invention relates to shift mechanisms, and more particularly to an improved shift mechanism for typewriters and printing telegraphs.

A general object of the invention is to provide a shift mechanism which is comparatively simple, entirely reliable in action, durable in service, and which is compact in arrangement.

A more specific object is to provide an improved shift mechanism which for each depression of the shift key, shifts the typebasket, platen, or carriage, as the case may be, alternately into position to write upper or lower case characters; and which, when the shift operation is completed, remains in the shifted position until the shift key is again depressed, whether or not the shift key is held down in the interim.

Other objects and features will be in part obvious and in part hereinafter pointed out in connection with the description taken in connection with the accompanying sheets of drawings forming part of this disclosure.

In the drawings, Fig. 1 shows in perspective view one embodiment of my invention, in which the typebasket or platen mounting is shown in the lowered position.

Figures 3, 4:
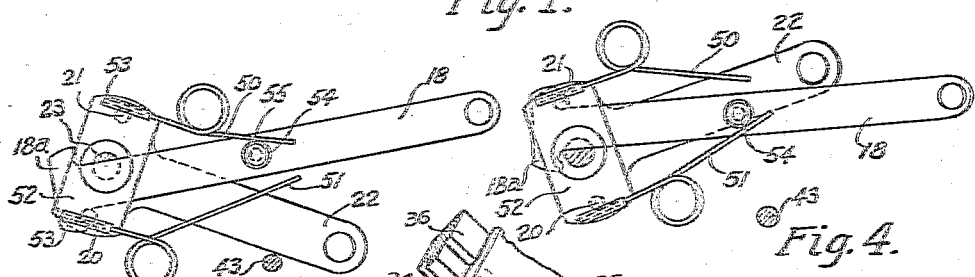
Fig. 3 is a simplified view of the primary shift elements of another embodiment of my invention, showing the shift lever in the lower position.
Fig. 4 is a view similar to Fig. 3, but showing the shift lever in the upper position.
Figure 5:
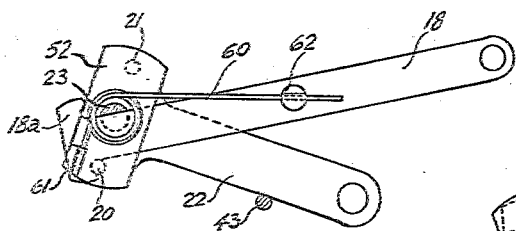
Figure 6:
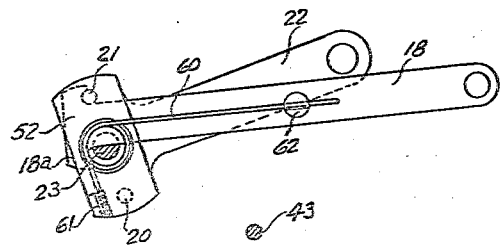

Figs. 5 and 6, corresponding to Figs. 3 and 4 respectively, show another embodiment of my invention.

Figure 7:
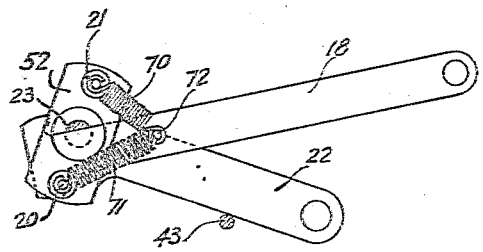
Figure 8:
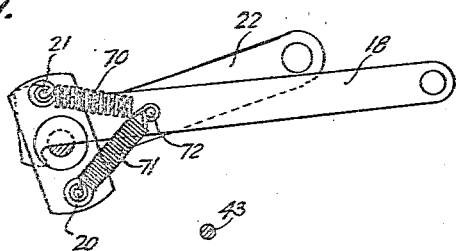

Figs. 7 and 8 show yet another embodiment of my invention, using traction springs to actuate the shift draw head.

Like characters represent like parts, and in the several views fixed pivots are shown crosshatched, while movable pivots are shown as circles.

Figure 1:
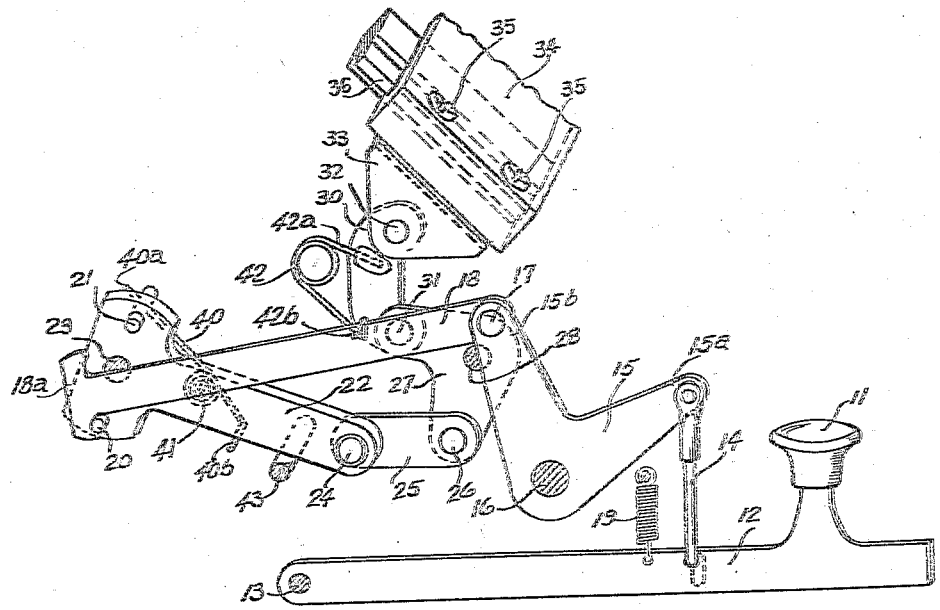
Figure 2:
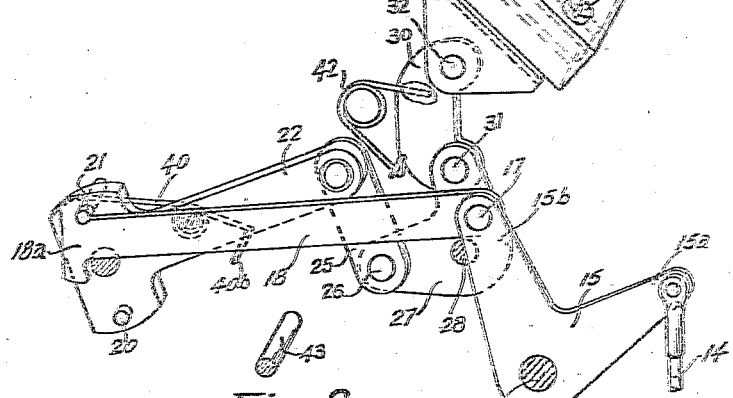
Fig. 2 is a similar view, showing the typebasket or platen mounting in the elevated position, the shift key and key lever being omitted.

Referring to Figs. 1 and 2 in detail, Fig. 1 shows in simplified diagrammatic form a shift mechanism in which 11 is the shift key and 12 the shift key lever pivoted at the fixed shaft or fulcrum 13. An adjustable link 14 connects the key lever 12 to one arm 15a of bell crank 15 which pivots about fixed shaft 16. The upper arm 15b of bell crank 15 is connected by a pin-bearing 17 to one end of reciprocating draw bar 18, the other end of which bar terminates in a T-shaped head 18a called the shift head. The laterally projecting ends of shift head 18a form pawls or hooks, as shown, termed the lower hook and upper hook respectively.

Positioned back of draw bar 18, and overlapping therewith, is an oscillatory member called the shift lever. Shift lever 22 is T-shaped, and pivots on fixed axis 23 located at the intersection of the longitudinal and transverse axes of the T. The cross member of the T thus forms opposed crank arms, in each of which is rigidly mounted a drive member designated as lower stud 20 and upper stud 21 respectively. The shift head 18a works interiorly of and is engageable with studs 20 and 21, and is shown in engagement with lower stud 20 in Fig. 1. It is constrained to remain close to shift lever 22 by plate 52 (omitted in Figs. 1 and 2 but shown in Fig. 3 et seq.).

The elongated end of shift lever 22 is connected by pin-bearing 24 with toggle link 25. Another pin-bearing 26 connects toggle link 25 with the lower arm of bell crank 27, which pivots about fixed axis 28. The upper arm of bell crank 27 is connected to the elevator link 30 by pin-bearing 31. The upper end of elevator link 30 is connected to bracket 33 by pin-bearing 32. The bracket 33 is attached to the slipper 34 by screws 35, as shown, or other suitable means. The slipper 34, which may form a part of the typebasket or of the platen mounting, may move in translation on a guide 36, as shown for illustrative purposes, or bracket 33 may be attached to other parts of the typebasket or platen mounting as may be desired, such variations being within the scope of the present invention. For present purposes, it may be assumed that when slipper 34, or its equivalent, has been given a limited movement in translation, and locked in position at the end of such travel, the operation of shifting from one case to the other has been completed.

The mechanism described above is that which operatively connects the key lever 12 or driver with the slipper 34 or follower. While the power transmitting means between key lever 12 and draw bar 18 has been shown as comprising a simple linkage mechanism, it will be understood that the invention is equally applicable to a construction including a power driving mechanism of which the key lever constitutes a control member.

Mechanism is also provided for controlling the direction of the shift action. This may be termed the reversing mechanism, and will next be described.

Referring again to Fig. 1, the principal control element of the reversing mechanism consists of the spring lever 40 mounted on a screw stud 41 screwed into the back side of shift lever 22. The spring lever 40 has a loop near the middle which encircles the shank of stud screw 41, a fixed end 40a which is caught back of stud 21 extended, and at the other end, the finger 40b is formed by bending the other end of the spring at right angles. This finger 40b projects beyond the face of shift lever 22 sufficiently to bear against the lower edge of draw bar 18 in certain relative positions of the two latter named members.

The secondary control element of the reversing mechanism is the hairpin spring 42, the fixed end 42a of which is mounted rigidly on the elevator link 30 by soldering, as shown, or in any other preferred manner. The free end of spring 42 is bent as shown to form a finger 42b positioned to bear upon the upper edge of draw bar 18 in certain relative positions of shift lever 22 and draw bar 18, one of which positions is shown in Fig. 1. The rotation clockwise of shift lever 22 is limited by stop pin 43, mounted on the frame (not shown) of the machine of which the shift mechanism forms a part.

Fig. 2 shows the same assembly of mechanism (except the key and key lever) as Fig. 1, the parts however, being shown in the alternative shift position, that is with the slipper 34 in the elevated position.

The operation of the mechanism shown in Fig. 1 is as follows: It is to be assumed initially that the previous shift action has drawn down slipper 34, and that the parts, with the exception of the draw bar 18, bell crank 15, and key lever 12, have been locked in the position shown by the shift lever 22 striking against the stop pin 43. In this position, the finger 42b of spring 42 bears downwardly against draw bar 18, causing the lower hook of shift head 18a to engage lower stud 20. Assuming now that the shift key is depressed, the key lever 12 and bell crank 15 are rotated in a clockwise direction. The consequent movement of draw bar 18 to the right draws stud 20 in counter clockwise rotation around fixed axis 23, elevating the long arm of shift lever 22. This throws the toggle link 25 over center, and rotates bell crank 27 clockwise around its axis 28. Elevator link 30 is thereby raised, elevating slipper 34 and removing the downward pressure exerted by spring 42 on draw bar 18. The movement of the shift lever continues until slipper 34 is fully elevated as shown in Fig. 2. It will be observed that in this position, the centers of shaft 28 and pin-bearings 31 and 32 are virtually in line, producing a toggle lock to lock slipper 34 in its elevated position.

The rotation of shift lever 22 brings finger 40b into engagement with the lower edge of draw bar 18, raising shift head 18a. The upward throw of shift head 18a is limited by its striking the under side of stud 21. Assuming now that the shift key is released, key lever 12 is drawn upward by retractile spring 19, and draw bar 18 is pushed to the left. As soon as the shift head 18a has passed underneath and clear of stud 21, spring finger 40b lifts it until it hooks underneath stud 21, and all parts of the mechanism are as shown in Fig. 2.

On the next depression of the shift key the sequence of operations is as follows: Key lever 12, link 14, bell crank 15 and drawbar 18 move as before, pulling shift head 18a to the right. Shift head 18a is now hooked under upper stud 21 and rotates shift lever 22 clockwise. Bell crank 27 is rotated counter clockwise around its axis 28 by toggle link 25, and the lower pin-bearing 31 of elevator link 30 is drawn to the left and downwards, breaking the vertical toggle combination. Slipper 34 is thereupon drawn down by the further rotation of shift lever 22 until the shift linkages are in the position shown in Fig. 1, and slipper 34 is locked in place as shown. As soon as the pull on draw bar 18a is relaxed, shift head 18a drops down onto lower stud 20, gravity being assisted by spring finger 42b pressing on the upper edge of draw bar 18. When the shift key is released, the key lever is drawn up by the retractile spring 19 and draw bar 18 is pushed to the left, permitting shift head 18a to hook over lower stud 20 as shown in Fig. 1. This completes the cycle of operations.

While the description of the operation of the mechanism is somewhat lengthy, in practice the cycle of operations is accomplished very quickly and with great precision. It is to be observed that the function of the spring 42 is merely to aid gravity, and under normal conditions the apparatus will function perfectly in the absence of spring 42. Where, however, machines are operated under unfavorable conditions such as on trains, aboard ships, or where it is unusually dusty, gravity may in time prove insufficient to produce reliable shift action, and it is for such adverse conditions that spring 42, or its equivalent, is provided. The spring lever 40, or its equivalent, is essential at all times, and it is for this reason that this member was termed the primary control element, while spring 42 was termed the secondary control element.

Referring now to Figs. 3 and 4, which correspond to Figs. 1 and 2 respectively as regards the shift positions illustrated, spring fingers 50 and 51 are rigidly mounted on plate 52 which is riveted to shift lever 22 by studs 20 and 21. The fixed ends of the spring fingers are slid into tubular clips 53 formed by curling over projections at the ends of plate 52 and are then secured in place, preferably by soldering. The spring fingers are formed with loops near the middle section to provide additional flexibility. They control shift head 18a by exerting pressure on roller 54 mounted on stud 55 riveted into the front face of draw bar 18. The reversing mechanism is thus seen to consist of draw bar 18 and shift hand 18a integral therewith, shift lever 22, and spring fingers 50 and 51, comprising the main elements; and studs 20 and 21 and roller 54 as auxiliary parts.

The operation of the reversing mechanism is as follows: Assume that the parts are initially in the positions shown in Fig. 3. It will be noted that spring finger 50 is pressing against roller 54 holding shift head 18a hooked over lower stud 20. When draw bar 18 is pulled to the right (by bell crank 15 as previously described), shift lever 22 is rotated counter clockwise around its axis 23, finally arriving at the upper shift position shown in Fig. 4. During the rotation of shift lever 22, the pressure of spring finger 50 downward on roller 54 has been relieved, and spring finger 51 has been rotated so as to exert an upward pressure on roller 54. Consequently, when draw bar 18 ceases to pull on lever stud 20, the shift head 18a is raised until stopped by upper stud 21. When draw bar 18 makes its return stroke to the left, shift head 18a hooks under stud 21 as shown in Fig. 4. On the next draw stroke of draw bar 18, shift lever 22 is rotated counter clockwise into the lower shift position as shown in Fig. 3, whereupon spring finger 50 exerts downward pressure to hook shift head 18a over lower stud 20, completing the cycle of operations. The movements of the shift linkages resulting from these operations are identically the same as those described in connection with Figs. 1 and 2, hence need not be repeated.

Figs. 5 and 6 show an embodiment of the invention operating in a similar manner to that shown in Figs. 3 and 4, but in which the spring fingers 50 and 51 are replaced by a single spring finger 60. Spring finger 60 is mounted on plate 52 by means of a tubular clip 61 formed by curling over a projection of plate 52. Spring finger 60 has a single loop concentric with axis 23, the free end extending at an angle of approximately 90° to the fixed end. The free end passes loosely thru a hole in swivel-pin 62 mounted rotatably in and extending from the front face of draw bar 18.

Without detailed analysis, it will be apparent that when shift lever 22 moves to the lower shift position, as shown in Fig. 5, spring finger 60 actuates draw bar 18 to hook draw head 18a over lower stud 20, hence on the subsequent draw stroke, shift lever 22 is moved to the upper shift position as shown in Fig. 6. On the next draw stroke, the rotation of shift lever 22 is reversed. Hence on alternating draw strokes of draw bar 18, shift lever 22 is caused alternately to move into the lower and upper shift positions.

Figs. 7 and 8 show another embodiment of the invention in which resilient tractive means are utilized to actuate shift head 18a. Fig. 7 corresponds to Fig. 5, and Fig. 8 to Fig. 6. By noting that tractive springs 70 and 71 are connected to the same pin 72 on draw bar 18, and that spring 70 is slightly shorter than spring 71, it will be apparent from the figures that the cycle of operations is identical with that described in connection with Figs. 3 and 4, hence further description is not required.

It will also be apparent that the invention provides a mechanism which is relatively simple and inexpensive in construction; which is compact, rugged and durable; which does not require fine adjustment in order to operate reliably, and which meets in a highly satisfactory manner the exacting requirements of a mechanism of this type.

Without further analysis, the foregoing will so fully reveal the gist of this invention that others can, by applying current knowledge, readily adapt it for various applications without omitting features which from the standpoint of prior art constitute essential characteristics of this invention, and therefore such adaptations should and are intended to be comprehended within the meaning or range of equivalency of the following claims.

What is claimed is:

1. In shift mechanisms for typing machines, the combination for producing a predetermined change in the typing relations between type and platen whereby lower or upper case characters are written at the choice of the operator, comprising a shift key; a linkage system; a pivoted oscillatory member provided with two drive members located on opposite sides of the pivot axis; a reciprocating pawl member actuated by said linkage system in response to the operation of the key lever; restoring means for said pawl member; and resilient means independent of said restoring means adapted to actuate said pawl member to cause alternate engagement with said drive members, whereby said oscillatory member is caused to oscillate between predetermined limiting positions.

2. In shift mechanisms for typing machines, the combination adapted to produce a predetermined change in the typing relations of type and platen, whereby lower or upper case characters can be written at the selection of the operator, comprising a shift key lever; a reciprocating pawl member provided with two extremely positioned hook members; actuating means between said shift key lever and said pawl member responsive to actuation of said shift key lever; restoring means for said pawl member; a pivoted oscillatory member provided with two engageable members located substantially opposite as regards the pivot axis of said oscillatory member; a printing mechanism mounting; linkage means operatively disposed between said oscillatory member and said printing mechanism mounting; and resilient means in addition to said restoring means adapted to produce alternate engagement between said pawl hook members and said engageable members, whereby the draw strokes of said pawl member produce oscillations of said oscillatory member, and said linkage means move said printing mechanism mounting alternately into predetermined limiting positions, and fix said printing mechanism mounting in said predetermined positions.

3. In shift mechanisms for typing machines, the combination for producing a predetermined change of the typing relations of type and plate whereby upper or lower case characters can be written at the selection of the operator, comprising a shift key lever; a reciprocating pawl member provided with two exteriorly positioned hook members; restoring means for said pawl member; power transmission means between said shift key lever and said pawl member responsive to actuation of said shift key lever; a pivoted oscillatory member provided with two engageable members located on functionally opposite sides of the pivot axis of said oscillatory member; resilient means in addition to said restoring means adapted to produce alternate engagement between said pawl hook members and said engageable members, whereby the reciprocation of said pawl member produces oscillations of said oscillatory member; a printing mechanism mounting; and linkage means operatively disposed between said oscillatory member and said printing mechanism mounting arranged to move said printing mechanism mounting alternately into predetermined limiting positions, said linkage means including means for retaining said printing mechanism mounting in said predetermined positions.

4. In shift mechanisms for typing machines, shift reversing mechanism comprising a shift key lever; a reciprocating pawl member provided with two exteriorly projecting pawls; restoring means for said pawl member; actuating means interposed between said shift key lever, and said pawl member, and responsive to the operation of the shift key lever; a pivoted oscillatory member provided with two engageable members positioned oppositely as regards the pivot axis and exteriorly as regards the pawl member; and resilient means in addition to said restoring means mounted on said oscillatory member and adapted to produce alternate engagements between said pawls and said engageable members, whereby the draw strokes of said pawl member in response to the operation of the shift key lever move the oscillatory member into alternate predetermined positions.

5. In shift mechanisms for typing machines, shift reversing mechanism comprising a shift key lever; a reciprocating pawl member provided with two exterior pawls; restoring means for said pawl member; actuating means between said key lever and said pawl member, and responsive to the operation of the key lever; a pivoted rocker lever provided with two crank pins positioned exteriorly of the pawl member; and resilient means in addition to said restoring means actuating said pawl member responsively to the angular position of the rocker lever, whereby the pawl member on successive draw strokes alternately engages the two crank pins producing predetermined reversals of said rocker lever.

6. In shift mechanism for typing machines, shift reversing mechanism comprising a shift key lever; a reciprocating pawl member provided with two exterior pawls; restoring means for said pawl member; actuating means between said key pawl member; a pivoted shift lever lever and said pawl member; a pivoted shift lever provided with two studs rigidly mounted and positioned oppositely as regards the pivot and exteriorly of the pawl member; and resilient, tractive means in addition to said restoring means actuating said pawl member responsively to the angular position of the pivoted shift lever, whereby successive draw strokes of said pawl member oscillate the shift lever between predetermined positions, the entire mechanism effecting a shift in typing from upper case to lower case characters and vice versa.

7. A shift mechanism of the character described comprising a reciprocating pawl member provided with two pawls at one end, restoring means for said pawl member a pivoted oscillatory member having two engageable members positioned oppositely as regards the pivot axis, a spring member attached to and movable with said oscillatory member, said spring member having an extending looped portion in operative connection with said pawl member such that said spring member is flexed in response to the angular movement of the oscillatory member and adapted to actuate said pawl member so as to produce alternate engagements between said pawls and said engageable members during each effective stroke of said pawl member, whereby said oscillatory member is caused to oscillate between predetermined angular positions.

8. In shift mechanisms, the combination for converting reciprocating motion into oscillatory motion of half periodicity, comprising a reciprocating pawl member provided with two exterior pawls at one end, restoring means for said pawl members, a pivoted oscillatory member having two engageable members positioned on two sides of the pivot axis; and flexible reversing means in addition to said restoring means responsive to the angular movement of the oscillatory member for predetermining the engagement of said pawl member alternately with said engageable members during successive effective strokes of said pawl member.

9. Shift mechanism for typing machines comprising in combination a shift key lever, a printing member movable to a predetermined position to select a desired case of characters, and means operatively connecting said shift key lever with said printing member including a reciprocating member actuated in response to movement of said shift key lever, a pivoted oscillatory member, cooperating parts in said oscillatory member and said reciprocating member providing for rotation of said oscillatory member in opposite directions in response to a cycle of movement of said reciprocating member, and additional resilient means for controlling engagement of said oscillatory and said reciprocating members to produce said opposite rotation of said oscillatory member on successive depressions of said shift key lever.

10. A shift mechanism for typing machines comprising, in combination, a pivoted shift key, a printing mechanism mounting movable into alternative positions for selection of upper and lower case characters, and means for causing said printer mechanism to move from one alternative position to the other in response to each depression of the shift key, said means including a pawl member, means for reciprocating said pawl member in response to each depression of the shift key, a pivoted oscillatory member provided with drive means adapted to be selectively engaged by said pawl member, restoring means for said pawl member, resilient means in addition to said restoring means adapted to cause alternate engagement of said pawl member with said drive means of said oscillatory member, and linkage mechanism for selectively adjusting said printing mechanism mounting to its alternative position in response to movement of said oscillatory member.

11. A shift mechanism of the character described comprising a platen, a printing mechanism mounting movable into alternative positions with respect to said platen to effect a predetermined shift of case, a shift key operable in a cycle of movement in an advance stroke followed by a return stroke upon release thereof, and means for effecting a shift in case from either case position upon actuation of said key in its advance stroke, and for retaining said parts in such adjusted shifted position during the return stroke of said key and until the advance stroke of a subsequent cycle of movement of the key.

HARRY J. NICHOLS.

CERTIFICATE OF CORRECTION.

Patent No. 2,049,468. August 4, 1936.

HARRY J. NICHOLS.

It is hereby certified that error appears in the printed specification of the above numbered patent requiring correction as follows: In the grant, line 6, for the title of invention "SHIFT MECHANISMS" read SHIFT MECHANISM; page 3, second column, line 9, claim 2, for "extremely" read exteriorly; line 61, claim 4, strike out the comma after the word "lever"; page 4, first column, line 35, claim 7, after "member" insert a comma; line 55, claim 8, for "members" read member; and that the said Letters Patent should be read with these corrections therein that the same may conform to the record of the case in the Patent Office.

Signed and sealed this 20th day of October, A. D. 1936.

Leslie Frazer (Seal)  Acting Commissioner of Patents.